July 3, 1923.
P. C. WADSWORTH
1,460,519
PROCESS OF CLEANING AND CONDITIONING COTTON FOR SPINNING
Filed June 6, 1921  3 Sheets-Sheet 1
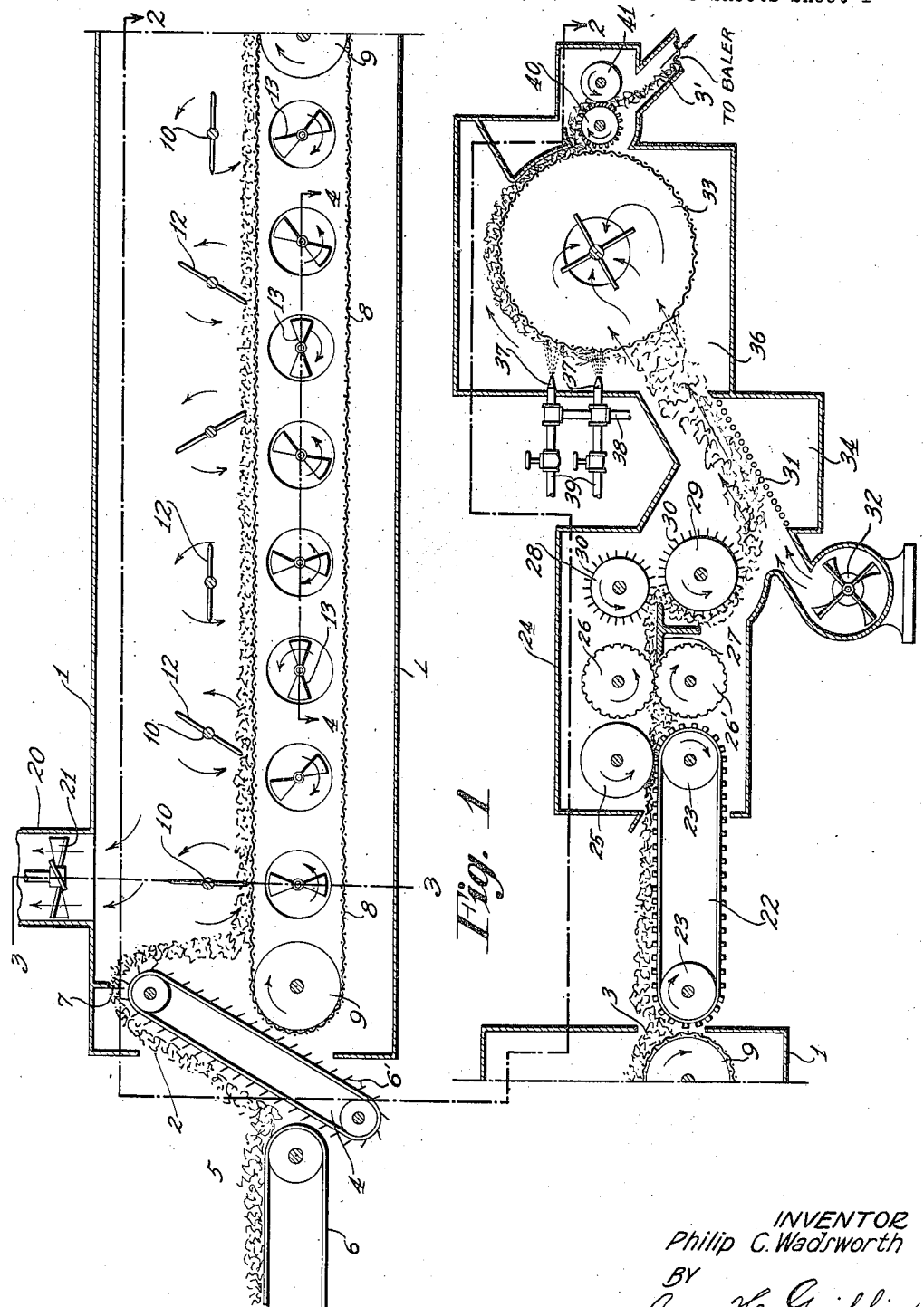
INVENTOR
Philip C. Wadsworth
BY
Jas. H. Griffin
ATTORNEY

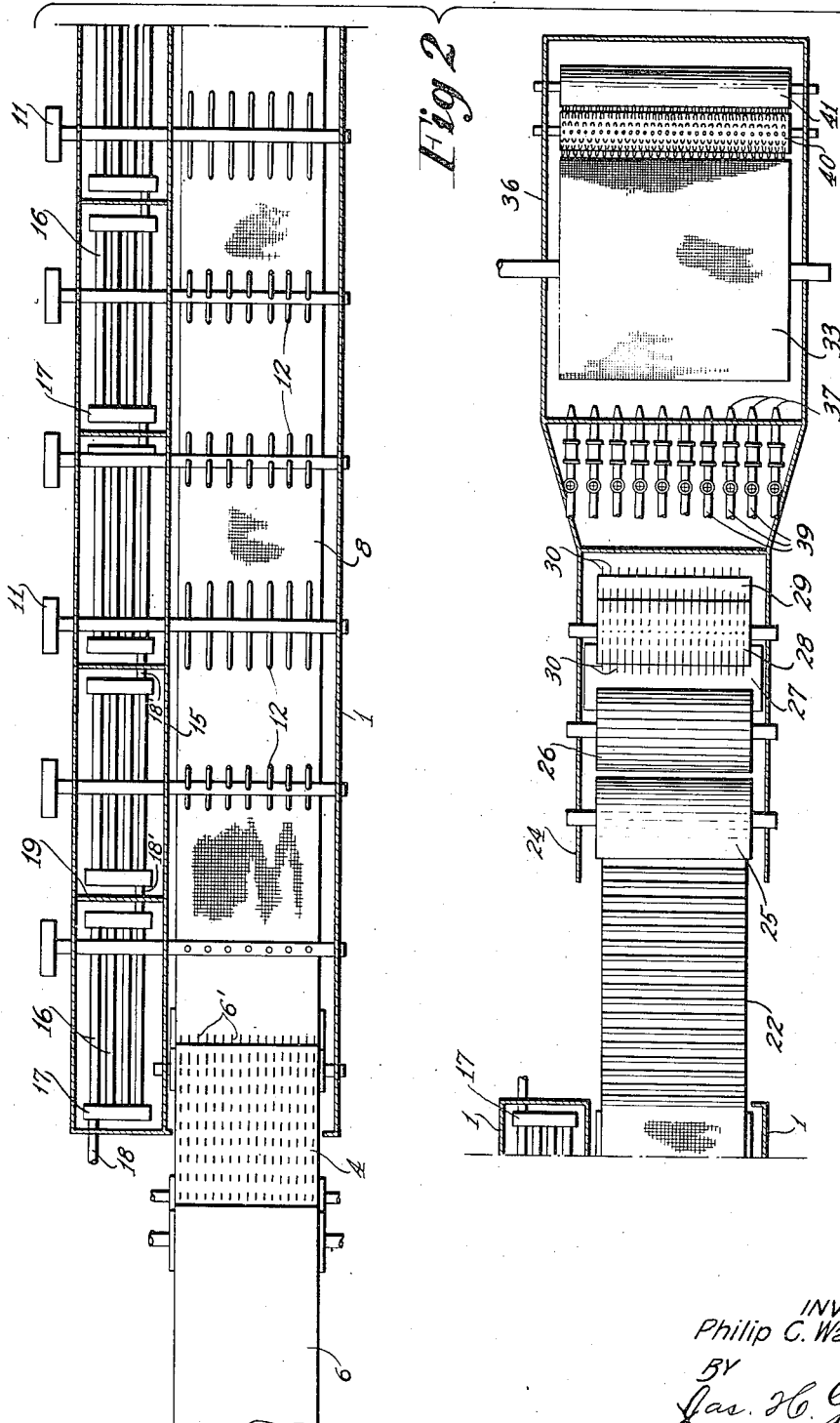

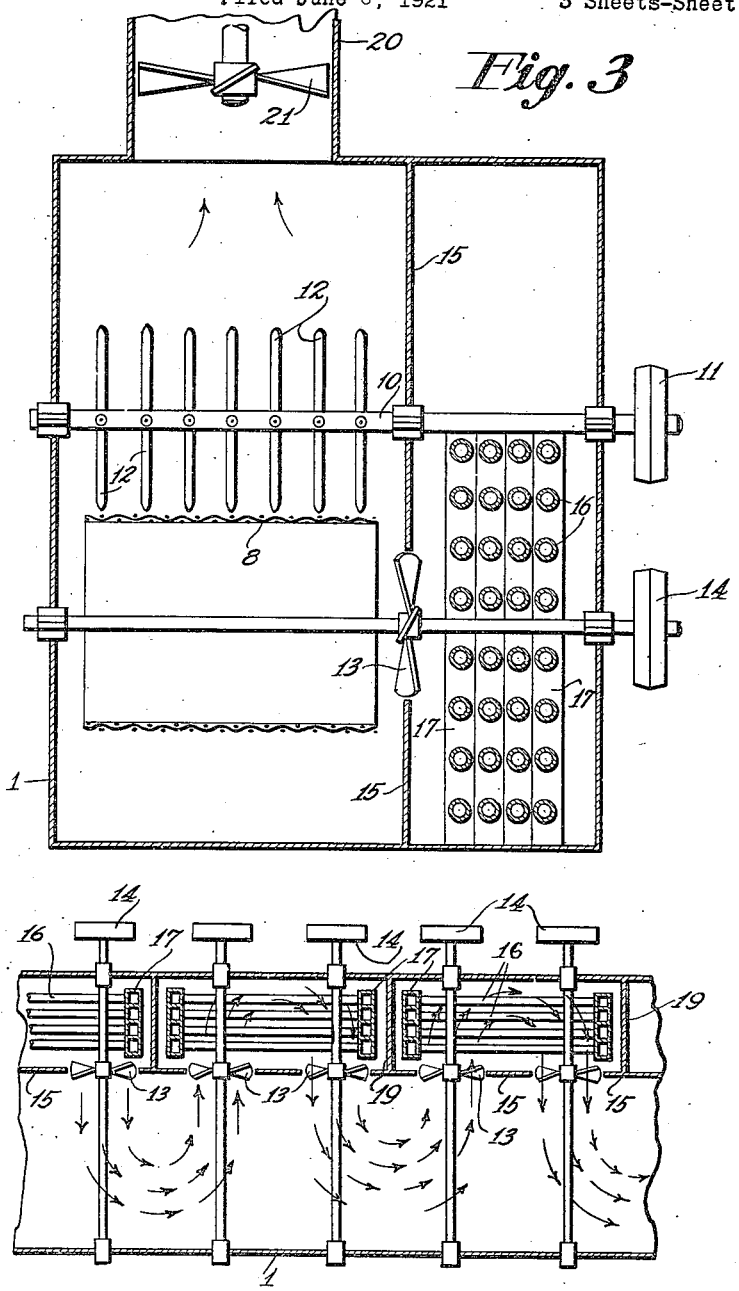

Patented July 3, 1923.

1,460,519

UNITED STATES PATENT OFFICE.

PHILIP C. WADSWORTH, OF NEW YORK, N. Y., ASSIGNOR TO COTONO CORPORATION, OF NEW YORK, N. Y., A CORPORATION OF NEW YORK.

PROCESS OF CLEANING AND CONDITIONING COTTON FOR SPINNING.

Application filed June 6, 1921. Serial No. 475,212.

*To all whom it may concern:*

Be it known that I, PHILIP C. WADSWORTH, a citizen of the United States, residing in the city of New York, borough of Manhattan, county and State of New York, have invented a certain new and useful Process of Cleaning and Conditioning Cotton for Spinning, of which the following is a specification.

This invention is a process of clearing and conditioning lint or previously ginned cotton for spinning, and, speaking generally, the object of the invention is to clean the lint cotton in an economical, expeditious and efficient manner, and with a minimum strain on, or injury to, the cotton fibres, thereby resulting in a product having superior qualities from a manufacturer's standpoint. The present process is for use on cotton which has been previously ginned, and, in this art, such cotton is known as "lint cotton."

With the foregoing object in view, the salient feature of the invention consists in dehydrating, or partially dehydrating. the cotton of its natural moisture, at a suitable stage in the cleaning process, thereafter cleaning the cotton, and, subsequently, and prior to, or at the time of, its delivery to a condenser, to reintroduce into, or recharge, the cotton with more or less moisture, preferably in sufficient quantity to restore the cotton substantially to its normal moisture content.

Lint cotton, normally, carries or contains, more or less mechanically, a certain amount of moisture or aqueous vapor, usually from six to eight per cent by weight, though, apparently, it is, to the feel, substantially dry. This normal moisture content I term the "natural moisture" of the cotton.

Applicant has discovered that the effect or tendency of this moisture, whether it be contained in the cotton, or in the extraneous matter carried by the cotton, or from whatever source derived, is to interfere with or preclude the expeditious cleaning of the cotton. This tendency or effect is attributable, probably, to the undue adhesiveness which said moisture occasions between the cotton fibre and the dirt or extraneous matter with which it is associated, due, in all liklihood, to the fact that.the moisture maintains the dirt in a somewhat soft or sticky condition, and, thereby, naturally increasing its adhesiveness.

When the cotton is dehydrated, however, either in whole or in part, the result is that the dirt and foreign matter can be quite readily freed from the cotton, and with far less beating or agitation of the cotton than is ordinarily required. The result of dehydrating the cotton seems to be substantially the same, in its general character, as that which flows from drying a garment which has been spattered with mud. It is not feasible to remove all the mud from the garment while the same retains its moist condition, but as soon as the garment dries, however, the dirt can be readily removed therefrom by brushing or beating.

Features and advantages of the invention, other than those adverted to, will be apparent from the hereinafter detailed description and claims, read in conjunction with the accompanying drawings.

The drawings illustrate, somewhat diagrammatically, an apparatus or machine, also forming part of my invention, which can be used in carrying out applicant's process, although it will be understood that such apparatus is illustrative only of one type of apparatus which may be thus employed.

Figure 1 shows, in two parts, a transverse sectional elevation through substantially the entire machine or apparatus, the lower portion of the figure being a continuation of the upper portion;

Figure 2 is a plan view of the machine or apparatus taken on line 2—2 of Figure 1;

Figure 3 is a view in elevation taken on line 3—3 of Figure 1; and

Figure 4 is a plan view taken on line 4—4 of Figure 1.

Numeral 1 designates a casing or housing for enclosing the dehydrating apparatus and a portion of the cleaning machinery, and it is provided with a raw cotton inlet 2 and a cotton discharge outlet 3 for the partially cleaned cotton. Operating in the inlet 2 is a cotton elevator or conveyor 4, which receives cotton 5 from any suitable source, such as an endless conveyor 6. The cotton elevator 4 is provided with a plurality of spaced fingers 6' which are staggered laterally with relation to a series of fingers 7 depending from the top of the casing, the two sets of fingers 6' and 7 cooperating, as will be readily understood, to separate and loosen up the cotton, whence it is dropped upon a foraminous conveyor 8, supported upon and operated by rollers 9. Positioned above conveyor 8 are a series of rotating breakers or beaters, the shafts 10 of which are driven by pulleys 11. The beater arms 12 cooperate in a well known manner with the foraminous conveyor 8 to loosen up and agitate the cotton, whereby it is freed from the heavier dirt, the latter dropping through the perforations in the conveyor to the bottom of casing 1, from which it can be removed, when required, in any suitable manner.

Positioned above the upper and lower surfaces of conveyor 8, and slightly to one side thereof, are a series of fans 13 which circulate warm air through casing 1, which air serves to dehydrate the cotton of its natural moisture as well as to assist, mechanically, in removing the dirt or foreign matter from the cotton. In order to enhance the agitation of the air, successive fans are driven in opposite directions, as indicated by the directional arrows applied to Figures 1 and 4. As appears in Figure 4, the fans are driven by pulleys 14. Along the medial line of the fan blades is a partition or wall 15, to one side of which are positioned a series of steam coils or radiators 16, the headers 17 of which are supplied with steam from any suitable source, and, if desired, the several radiators may be connected by pipes 18', whereby steam supplied through pipe 18 is successively fed through the several radiators. Extending at right angles to partition 15 are a series of walls or partitions 19, thereby separating the heating coils and forming chambers between each two successive fans, whereby the air is circulated in the manner indicated by the arrows in Figure 4. Extending from the top of casing 1 near the inlet thereof, is an exit draft or flue 20 in which is positioned suction fan 21, whereby an outlet is provided for the lighter particles of dirt, leaves and etc., which do not fall by gravity through the foraminous conveyor 8.

By means of the apparatus and mechanism hereinbefore described, the cotton is dehydrated to the extent desired, freed from substantially all its extraneous heavy matter, and, also, from some of the lighter dirt. The remainder of the extraneous matter on the cotton is thereafter removed, and the moisture restored to the cotton to the extent desired, by means of the apparatus about to be described.

The cotton having reached the end of the conveyor 8, it is delivered on to a lattice, traveling belt 22, carried by rollers 23, whence it enters an auxiliary chamber 24 and passes beneath a roller 25, which exerts a slight compressing effect upon it, whereupon it is delivered between a pair of transversely fluted rollers 26 and 26', by means of which it is converted into a loose bat, which bat is delivered upon a table 27, whence it passes between the cooperating loosening rollers 28 and 29. Rollers 28 and 29 travel in the same direction, as indicated by the arrows thereon, and each of the rollers is provided with fingers or pins 30 which operate to thoroughly loosen and break up the cotton. Roller 28 travels at a comparatively slow speed, say at ten revolutions per minute, whereas roller 29 travels at a relatively high speed, say at five hundred to a thousand revolutions per minute, the result of which is that the cotton is broken up into a loose, fluffy condition, and falls off, or is partially blown off, the roller 29 on to or over a grid 31. Positioned in the lower part of chamber 24 is a fan 32, which forcibly directs a blast of air over grid 31, and forces the cotton against a foraminous condensing roll 33. The opening up of the cotton by means of rollers 28 and 29 in the manner described permits of all the small particles of dirt, leaves and other extraneous matter to be readily separated, and such foreign material passes through grid 31 and is deposited in chamber 34.

The clean cotton upon entering chamber 36 of the condenser is deposited upon a condenser roll 33 in the form of a bat and in a manner well known to the art, so that the operation of the condenser need not be described in detail.

The cotton having been deposited on the condenser roll, steam or aqueous vapor is projected against it, or the moisture may be supplied to the cotton preliminarily to condensing the cotton, from a series of valved controlled pipes and nozzles 37, whereby the cotton has its normal content of moisture restored thereto, or to such extent, either above or below the normal, as may be desired. The preferred manner of adding the moisture to the cotton consists in atomizing water introduced into a header 38 by means of compressed air entering pipes 39, and for this purpose well known liquid vaporizers may be employed, such as those commonly used for vaporizing liquids by means of steam or compressed air. The moistened bat of cotton having been formed in the manner described, it is removed from the condenser roll 33 by means of stripper roll 40, whereupon it is delivered, through the cooperating action of roller 41, into the cotton exit chute 3'. It is then ready for manufacturing purposes, or otherwise, or, if desired, it may be baled, depending upon circumstances.

The temperature in the chamber 1 during the passing of the cotton therethrough is preferably maintained at from 100 to 150 degrees F., though, of course, it may be somewhat above or somewhat below this temperature, depending upon the speed of travel of conveyor 8. This speed and temperature are preferably so controlled that, substantially one-half of the normal moisture content of the cotton is removed during its treatment on the conveyor 8.

The extent to which the cotton is dehydrated may be controlled or determined empirically, as one practicing the process soon learns to recognize the effect of partially dehydrating it, but, of course, suitable physical or chemical tests may be resorted to if desired. Similarly, the extent to which the cleaned cotton is hydrated may be determined.

Applicant's process not only cleans cotton more thoroughly than is feasible with any commercial process heretofore suggested or employed, but, moreover, results in a superior product, due to the fact, mainly, that the cleaning is effected without subjecting the cotton to drastic beating, or reginning, thereby avoiding injury to the staple or disturbing the twist of the cotton.

It will be understood that the cleaning process may be practiced at the field, or at any desired central plant, and then baled so that clean cotton may be delivered to the mill for manufacturing purposes. Thus in Figure 1, I have shown for the purpose of illustration, and in the interest of clearness, the legend "To baler" and it will be understood that any suitable form of baling apparatus may be employed in this connection. It will be understood that formal modifications may be made in the specific process described, such as the substitution of equivalents, and that parts of the process may be used to advantage without necessarily employing the complete process, and, moreover, that parts of the process may be used in environments other than those herein set forth, all without departing from the spirit or substance of the invention, the scope of which is as broadly novel as is commensurate with the appended claims.

Having thus fully described the invention, what I claim as new, and desire to secure by Letters Patent is:

1. In the art of treating lint cotton, the process which consists in partially dehydrating the cotton of its natural moisture after it has been ginned, and maintaining it in such condition for cleaning.

2. In the art of treating lint cotton, the process which consists in partially dehydrating the cotton of its natural moisture after it has been ginned, and cleaning such cotton while in such dehydrated condition.

3. In the art of treating lint cotton, the process which consists in partially dehydrating the cotton of its natural moisture after it has been ginned, cleaning such cotton while in dehydrated condition, and subsequently restoring the natural moisture to the cleaned cotton.

4. In the art of treating lint cotton, the process which consists in dehydrating previously ginned cotton for the purpose of removing its natural moisture, and simultaneously cleaning such cotton.

5. In the art of treating lint cotton, the process which consists in partially dehydrating the cotton of its natural moisture after it has been ginned, cleaning such cotton while in dehydrated condition and thereafter hydrating the cotton.

6. In the art of treating lint cotton, the process which consists in partially dehydrating the cotton of its natural moisture, and simultaneously partially cleaning the cotton, thereafter subjecting such dehydrated and partially cleaned cotton to a further cleaning operation and thereafter hydrating the cotton.

7. In the art of treating lint cotton, the process which consists in removing natural moisture from cotton after it has been ginned, then cleaning the cotton, then delivering it to a condenser to form the cotton into a lap, and hydrating it while in the form of a lap.

8. In the art of treating lint cotton, the process which consists in partially dehydrating previously ginned cotton of its natural moisture, agitating and partially cleaning the cotton while it is being dehydrated, thereafter forcibly projecting the cotton against a grid to effect a further cleaning thereof, thereafter pneumatically projecting the cotton against a foraminous wall, passing air through this wall to hold the cotton to the wall and to further clean the cotton, thereafter removing the cotton from the foraminous wall and forming it into a lap, and introducing moisture into the cotton after it has passed the grid.

9. In the art of treating lint cotton, the process which consists in disintegrating a lap of previously ginned cotton, circulating heated air through and about the disintegrated cotton to partially dehydrate the cotton of its natural moisture while such cotton is being agitated and partially cleaned, thereafter forming the partially cleaned and dehydrated cotton into a lap, then disintegrating the lap and subjecting the cotton to a further cleaning operation, then forming the cotton into another lap, compressing the last mentioned lap, and hydrating the cotton after said cleaning steps have been completed.

10. In the art of treating lint cotton, the process which consists in disintegrating a lap of previously ginned cotton, circulating heated air through and about the disintegrated cotton to remove at least a part of the natural moisture from the cotton while such cotton is being agitated and partially cleaned, thereafter forming the partially cleaned and hydrated cotton into a lap, then disintegrating the lap and subjecting the cotton to a further cleaning operation, then forming the cotton into another lap, compressing the last mentioned lap, and spraying moisture onto the cotton after said cleaning operations are concluded.

11. In the art of treating lint cotton, the process which consists in passing cotton through a heating chamber to clean the cotton and to remove at least a part of its natural moisture, beating the cotton during such passage, thereafter forming the cotton into a lap, then disintegrating the lap and projecting the disintegrated cotton against an inclined grid to effect a further cleaning operation, pneumatically transporting the cotton from the grid to a rotatable foraminous drum, producing a partial vacuum within the drum to cause the cotton to be held in the form of a thin layer upon the drum, and to simultaneously further clean such cotton, thereafter removing the layer from the drum and forming it into a lap, and introducing moisture into the cotton after the several cleaning operations thereon have been completed In testimony whereof I have signed the foregoing specification.

PHILIP C. WADSWORTH.